(12) United States Patent
Kim et al.

(10) Patent No.: US 10,397,607 B2
(45) Date of Patent: Aug. 27, 2019

(54) COLOR RESIDUAL PREDICTION FOR VIDEO CODING

(71) Applicant: QUALCOMM Incorporated, San Diego, CA (US)

(72) Inventors: Woo-Shik Kim, San Diego, CA (US); Wei Pu, San Diego, CA (US); Jianle Chen, San Diego, CA (US); Joel Sole Rojals, La Jolla, CA (US); Liwei Guo, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 556 days.

(21) Appl. No.: 14/528,794

(22) Filed: Oct. 30, 2014

(65) Prior Publication Data

US 2015/0124865 A1  May 7, 2015

Related U.S. Application Data

(60) Provisional application No. 61/899,038, filed on Nov. 1, 2013.

(51) Int. Cl.
*H04N 19/59* (2014.01)
*H04N 19/176* (2014.01)
(Continued)

(52) U.S. Cl.
CPC .......... *H04N 19/59* (2014.11); *H04N 19/103* (2014.11); *H04N 19/105* (2014.11);
(Continued)

(58) Field of Classification Search
CPC ...... H04N 19/186; H04N 19/50; H04N 19/61; H04N 19/59
See application file for complete search history.

(56) References Cited

U.S. PATENT DOCUMENTS

| 8,687,709 B2 | 4/2014 | Hsu et al. |
| 2010/0020866 A1 | 1/2010 | Marpe et al. |

(Continued)

FOREIGN PATENT DOCUMENTS

| CN | 1846437 A | 10/2006 | |
| WO | WO 2013064100 A1 * | 5/2013 | ........... H04N 19/159 |
| WO | 2015009732 A1 | 1/2015 | |

OTHER PUBLICATIONS

Kawamura K., et al., "Non-RCE 1: Inter colour-component residual coefficients prediction," Joint Collaborative Team on Video Coding (JCT-VC) of ITU-T SG 16 WP 3 and ISO / IEC JTC 1 / SC 29/ WG 11, 15th Meeting: Geneva, CH, Oct. 23-Nov. 1, 2013, [JCTVC-O0263], Oct. 24, 2013, pp. 1-5.

(Continued)

*Primary Examiner* — Mainul Hasan
(74) *Attorney, Agent, or Firm* — Shumaker & Sieffert, P.A.

(57) ABSTRACT

A method of decoding video data includes decoding a first block of video data to produce a block of reconstructed luma residual values and a block of predicted chroma residual values, wherein the block of video data has one of a 4:2:0 or a 4:2:2 chroma sub-sampling format. The method further includes performing a color residual prediction process to reconstruct a block of chroma residual values for the first block of video data using a subset of the reconstructed luma residual values as luma predictors for the block of predicted chroma residual values.

26 Claims, 10 Drawing Sheets

(51) Int. Cl.
*H04N 19/103* (2014.01)
*H04N 19/136* (2014.01)
*H04N 19/105* (2014.01)
*H04N 19/50* (2014.01)
*H04N 19/186* (2014.01)
*H04N 19/61* (2014.01)

(52) U.S. Cl.
CPC ......... *H04N 19/136* (2014.11); *H04N 19/176* (2014.11); *H04N 19/186* (2014.11); *H04N 19/50* (2014.11); *H04N 19/61* (2014.11)

(56) References Cited

U.S. PATENT DOCUMENTS

| 2011/0249754 | A1* | 10/2011 | Karczewicz | H04N 19/176 375/240.18 |
| 2012/0287995 | A1  | 11/2012 | Budagavi   |                        |
| 2013/0022120 | A1* | 1/2013  | Gupte      | H04N 19/176 375/240.16 |
| 2013/0136174 | A1  | 5/2013  | Xu et al.  |                        |
| 2014/0355667 | A1  | 12/2014 | Lei et al. |                        |
| 2015/0326863 | A1* | 11/2015 | Francois   | H04N 19/176 375/240.24 |

OTHER PUBLICATIONS

Yeo C., et al., "Chroma Intra Prediction Using Template Matching With Reconstructed Luma Components," 18th IEEE International Conference on Image Processing, 2011, pp. 1637-1640.
International Search Report and Written Opinion for International Application No. PCT/US2014/063523, dated Mar. 25, 2015; 12 pp.
Kawamura, et al., "Chroma intra prediction based on residual luma samples in 4:2:2 chroma format", JCT-VC Meeting;MPEG Meeting; Jul. 11, 2012-Jul. 20, 2012; Stockholm; (Joint Collaborative Team on Video Coding of ISO/IEC JTC1/SC29/WG11 and ITU-T SG.16); URL: http://wftp3.itu.int/av-arch/jctvc-site/,, No. JCTVC-J0358, Jul. 3, 2012, 3 pp., XP030112720.
Kawamura, et al., "Chroma intra prediction based on residual luma samples", JCT-VC Meeting; MPEG Meeting; Jul. 14, 2011-Jul. 22, 2011; Torino; (Joint Collaborative Team on Video Coding of ISO/IEC JTC1/SC29/WG11 and ITU-T SG.16); URL:http://wftp3.itu.int/av-arch/jctvc-site/,No. JCTVC-F095, Jul. 1, 2011, 4 pp., XP030009118.
Poynton, "Digital Video and HDTV", Jan. 1, 2003, Digital Video and HDTV: Algorithms and Interfaces, Morgan Kaufmann, pp. 90-93,333, XP002450116, ISBN: 978-1-55860-792-7; 6 pp.
Pu, et al., "Non RCE1: Inter Color Component Residual Prediction", JCT-VC Meeting; Jul. 25, 2013 through Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/,, No. JCTVC-N0266, Jul. 30, 2013, XP030114791, 7 pp.
Response to Second Written Opinion dated Nov. 17, 2015, from International Application No. PCT/US2014/063523, filed on Jan. 16, 2016, 6 pp.
Response to Written Opinion dated Mar. 25, 2015, from International Application No. PCT/US2014/063523, filed on Sep. 1, 2015, 5 pp.
Second Written Opinion from International Application No. CT/US2014/063523, dated Nov. 17, 2015, 17 pp.
Wiegand et al., "WD1: Working Draft 1 of High-Efficiency Video Coding", JCTVC-C403, 3rd Meeting: Guangzhou, CN, Oct. 7-15, 2010, (Joint Collaborative Team on Video Coding of ISO/IEC JTC1/SC29/WG11 and ITU-T SG.16); Jan. 6, 2011, 137 pp.
Wiegand et al., "WD2: Working Draft 2 of High-Efficiency Video Coding," JCTVC-D503, 4th Meeting: Daegu, KR, Jan. 20-28, 2011, (Joint Collaborative Team on Video Coding of ISO/IEC JTC1/SC29/WG11 and ITU-T SG.16); Apr. 15, 2011, 153 pp.
Wiegand et al., "WD3: Working Draft 3 of High-Efficiency Video Coding," Document JCTVC-E603, 5th Meeting: Geneva, CH, Mar. 16-23, 2011,(Joint Collaborative Team on Video Coding of ISO/IEC JTC1/SC29/WG11 and ITU-T SG.16); May 9, 2015, 193 pp.

Bross et al., "WD4: Working Draft 4 of High-Efficiency Video Coding," 6th Meeting: Torino, IT, Jul. 14 through 22, 2011, (Joint Collaborative Team on Video Coding of ISO/IEC JTC1/SC29/WG11 and ITU-T SG.16); JCTVC-F803_d2, Oct. 4, 2011, 226 pp.
Bross et al., "WD5: Working Draft 5 of High-Efficiency Video Coding," 7th Meeting: Geneva, Switzerland, Nov. 21 through 30, 2011, (Joint Collaborative Team on Video Coding of ISO/IEC JTC1/SC29/WG11 and ITU-T SG.16);JCTVC-G1103_d2, Dec. 30, 2011, 214 pp.
Bross et al., "High efficiency video coding (HEVC) text specification draft 6," 8th Meeting: San Jose, CA, USA, Feb. 1 through 10, 2012, (Joint Collaborative Team on Video Coding of ISO/IEC JTC1/SC29/WG11 and ITU-T SG.16); JCTVC-H1003, Apr. 2, 2012, 259 pp.
Bross et al., "High efficiency video coding (HEVC) text specification draft 7," 9th Meeting: Geneva, CH, Apr. 27 through May 7, 2012, (Joint Collaborative Team on Video Coding of ISO/IEC JTC1/SC29/WG11 and ITU-T SG.16); JCTVC-I1003_d2, Jun. 1, 2012, 290 pp.
Bross et al., "High efficiency video coding (HEVC) text specification draft 8," 10th Meeting: Stockholm, SE, Jul. 11 through 20, 2012, (Joint Collaborative Team on Video Coding of ISO/IEC JTC1/SC29/WG11 and ITU-T SG.16); JCTVC-J1003_d7, Jul. 28, 2012, 261 pp.
Bross et al., "High efficiency video coding (HEVC) text specification draft 9," 11th Meeting: Shanghai, CN, Oct. 10 through 19, 2012, (Joint Collaborative Team on Video Coding of ISO/IEC JTC1/SC29/WG11 and ITU-T SG.16); JCTVC-K1003_v7, Nov. 2, 2012, 290 pp.
Bross et al., "High efficiency video coding (HEVC) text specification draft 10 (For FDIS & Last Call)," 12th Meeting: Geneva, CH, Jan. 14 through 23, 2013, (Joint Collaborative Team on Video Coding of ISO/IEC JTC1/SC29/WG11 and ITU-T SG.16); JCTVC-L1003_v34, Mar. 19, 2013, 310 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.
ITU-T H.265, Series H: Audiovisual and Multimedia Systems, Infrastructure of audiovisual services—Coding of moving video, Advanced video coding for generic audiovisual services, The International Telecommunication Union. Oct. 2014, 540 pp.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
Bross et al., "Editors provision corrections to HEVC version 1", 13th Meeting: Incheon, KR, Apr. 17 through 26, 2013, (Joint Collaborative Team on Video Coding of ISO/IEC JTC1/SC29/WG11 and ITU-T SG.16); URL: http://phenix.int-evry.fr/jct/doc_end_user/documents/13_Incheon/wg11/JCIVCM0432-v3.zip; JCTVC-M0432_v3, Apr. 25, 2013, 310 pp.
Flynn et al., "High Efficiency Video Coding (HEVC) Range Extensions text specification: Draft 4", 3 (Joint Collaborative Team on Video Coding of ISO/IEC JTC1/SC29/WG11 and ITU-T SG.16); URL: http://phenix.int-evry.fr/ict/doc_end_user/documents/14_Vienna/wg11/JCTVC-N1005-v3.zip; JCTVC-N1005_v1, Aug. 8, 2013, 332 pp.
International Preliminary Report on Patentability from International Application No. PCT/US2014/063523, dated Feb. 5, 2016, 6 pp.
Pu, et al., "Non RCE1: Inter Color Component Residual Prediction", JCT-VC Meeting; Jul. 25, 2013 through Aug. 2, 2013; Vienna; (Joint Collaborative Team on Video Coding of ISO/IEC JTC1/SC29/WG11 and ITU-T SG.16); URL: http://wftp3.itu.int/av-arch/jctvc-site/,, No. JCTVC-N0266v5, Jul. 28, 2013, XP055225294, 11 pp.

* cited by examiner

COLOR RESIDUAL PREDICTION FOR VIDEO CODING

This application claims the benefit of U.S. Provisional Application No. 61/899,038, filed Nov. 1, 2013, the entire content of which is incorporated by reference herein.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure is related to the field of video coding and compression. In particular, this disclosure describes techniques that may be used for color residual prediction for video blocks using a chroma sub-sampling format other than 4:4:4 (e.g., 4:2:2 or 4:2:0 chroma sub-sampling formats).

In one example of the disclosure, a method of decoding video data, the method comprises decoding a first block of video data to produce a block of reconstructed luma residual values and a block of predicted chroma residual values, wherein the first block of video data has one of a 4:2:0 or a 4:2:2 chroma sub-sampling format, and performing a color residual prediction process to reconstruct a block of chroma residual values for the first block of video data using a subset of the reconstructed luma residual values as luma predictors for the block of predicted chroma residual values.

In one example disclosure, an apparatus configured to decode video data, the apparatus comprises a video data memory configured to store video information related to a first block of video data, and a video decoder configured to decode the first block of video data to produce a block of reconstructed luma residual values and a block of predicted chroma residual values, wherein the first block of video data has one of a 4:2:0 or a 4:2:2 chroma sub-sampling format, and perform a color residual prediction process to reconstruct a block of chroma residual values for the first block of video data using a subset of the reconstructed luma residual values as luma predictors for the block of predicted chroma residual values.

In another example of the disclosure, a method of encoding video data, the method comprises encoding a first block of video data to produce a block of reconstructed luma residual values and a block of chroma residual values, wherein the first block of video data has one of a 4:2:0 or a 4:2:2 chroma sub-sampling format, and performing a color residual prediction process to form a block of predicted chroma residual values for the first block of video data using a subset of the reconstructed luma residual values as luma predictors for the block of chroma residual values.

In another example, this disclosure describes a computer-readable storage medium storing instructions that, when executed, cause one or more processors of a device configured to decode video data to decode a first block of video data to produce a block of reconstructed luma residual values and a block of predicted chroma residual values, wherein the first block of video data has one of a 4:2:0 or a 4:2:2 chroma sub-sampling format, and perform a color residual prediction process to reconstruct a block of chroma residual values for the first block of video data using a subset of the reconstructed luma residual values as luma predictors for the block of predicted chroma residual values.

The details of one or more examples are set forth in the accompanying drawings and the description below. Other features, objects, and advantages will be apparent from the description and drawings, and from the claims.

DETAILED DESCRIPTION

This disclosure is related to the field of video coding and compression. In particular, this disclosure describes techniques that may be used for color residual prediction for video blocks using a chroma sub-sampling format other than 4:4:4 (e.g., 4:2:2 or 4:2:0 chroma sub-sampling formats).

Color residual prediction is a video coding technique that involves predicting chroma residual values (e.g., both Cr and Cb chroma values in a YCrCb video block) from reconstructed luma (Y) residual values. Since the luma residual values of a block of video data are often correlated with the chroma residual values, further prediction of the chroma residual values will results in greater compression and increased coding efficiency.

To perform color residual prediction, chroma values of a block may be first predicted from chroma values of another block within the same picture (e.g., intra-prediction) or from chroma values of another block in another picture (e.g., inter-prediction) to form chroma residual values. The chroma residual values of the block of video data may then be further predicted from reconstructed luma residual values of the same block. Typically, the luma residual values used for the prediction are scaled before being used in the prediction.

In some video coding techniques, blocks of video data are coded using a 4:4:4 chroma sub-sampling format. That is, for each luma (Y) values, there is one corresponding red chroma value (Cr) and one corresponding blue chroma value (Cb). Thus, for 4:4:4 video blocks, there is one corresponding luma residual value in the same position as each chroma value (Cr and Cb) that may be used as the predictor for color residual prediction. However, other video coding techniques may use chroma sub-sampling formats that use fewer chroma components than luma components (e.g., 4:2:2 chroma sub-sampling or 4:2:0 chroma sub-sampling). As such, the luma component to use for color residual prediction is not self-evident. This disclosure proposes various techniques for performing color residual prediction for chroma sub-sampling formats having fewer chroma components than luma components.

Figure 1:
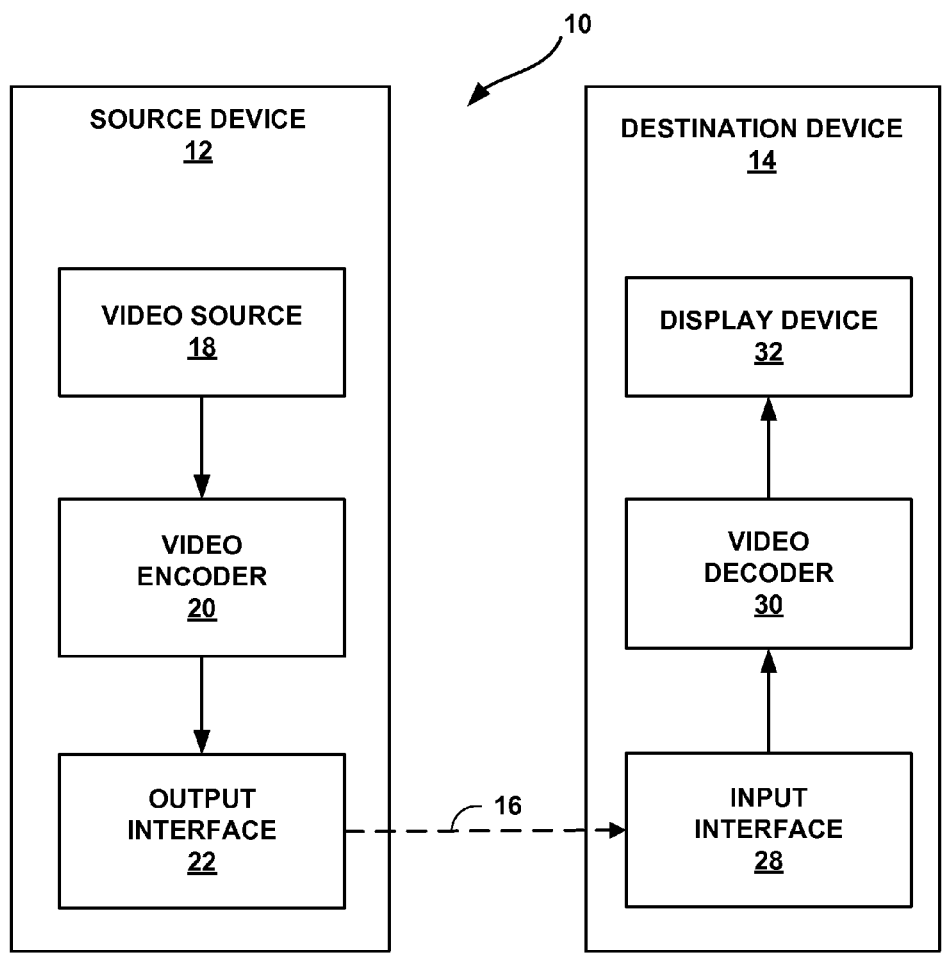
FIG. 1 is a block diagram illustrating an example video encoding and decoding system that may utilize the techniques described in this disclosure.

FIG. 1 is a block diagram illustrating an example video encoding and decoding system that may implement one or more of the techniques described herein. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device (not shown). Similarly, encoded data may be accessed from the storage device by input interface 28. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In other examples, a source device and a destination device may include other components or arrangements. For example, source device 12 may receive video data from an external video source, such as an external camera. Likewise, destination device 14 may interface with an external display device, rather than including an integrated display device.

The illustrated system 10 of FIG. 1 is merely one example. Any digital video encoding and/or decoding device may perform the techniques described herein. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

As will be explained in more detail below, video encoder 20 and/or video decoder 30 may be configured to implement the techniques of this disclosure. As one example, video encoder 20 and/or video decoder 30 may be configured to encode/decode a first block of video data to produce a block of reconstructed luma residual values and a block of predicted chroma residual values, wherein the block of video data has one of a 4:2:0 and a 4:2:2 chroma sub-sampling format, and perform a color prediction process to reconstruct a block of chroma residual values for the first block of video data using a subset of the reconstructed luma residual values as luma predictors for the block of predicted chroma residual values.

Video encoder 20 and video decoder 30 may operate according to a video coding standard, such as the High Efficiency Video Coding (HEVC) standard, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC has developed the HEVC standard. A recent draft of the HEVC standard, JCTVC-L1003, Benjamin Bross Woo-Jin Han, Jens-Ranier Ohm, Gary Sullivan, Ye-Kui Wang, "High Efficiency Video Coding (HEVC) text specification draft 10 (for FDIS & Consent)," Joint Collaborative Team on Video Coding (JCT-VC) of ITU-T SG 16 WP 3 and ISO/IEC JTC 1/SC 29/WG 11, 12th Meeting: Geneva, CH, 14-23 Jan. 2013, is available at the following location: phenix.itsudparis.eu/jct/doc_end_user/documents/12_Geneva/wg11/JCTVC-L1003-v11.zip.

Another draft of the HEVC standard, is referred to herein as "WD10 revisions" described in Bross et al., "Editors' proposed corrections to HEVC version 1," Joint Collaborative Team on Video Coding (JCT-VC) of ITU-T SG16 WP3 and ISO/IEC JTC1/SC29/WG11, 13th Meeting, Incheon, KR, April 2013, which is available at the following location: phenix.int-evry.fr/jct/doc_end_user/documents/13_Incheon/wg11/JCTVCM0432-v3.zip.

The HEVC standardization efforts were based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU), also referred to as coding tree units (CTU), that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock (LCU or CTU) may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0 or List 1) for the motion vector. When a current video block, e.g., PU, is coded using intra motion compensation according to the techniques of this disclosure, data defining a motion vector for the block may describe, for example, a horizontal component of the motion vector, a vertical component of the motion vector, a resolution for the motion vector (e.g., one-quarter pixel precision or one-eighth pixel precision). However, the data defining the motion vector for intra motion compensation according to the techniques of this disclosure need not identify a reference picture to which the motion vector points, as the reference block is within same frame or picture as the current video block.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

As noted above, video encoder 20 and video decoder 30 may be configured to inter- or intra-predict PUs of a CU. In general, inter-coding involves prediction relative to one or more reference pictures. A reference picture may be a previous picture in temporal order, a future picture, or a combination of predictions from two or more previously encoded pictures. Video encoder 20 or video encoder 20 may store the reference pictures in a decoded picture buffer (DPB).

Following intra-predictive or inter-predictive coding using the PUs of a CU, video encoder 20 or video decoder 30 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 or video decoder 30 may form the TUs including the residual data for the CU, and then transform the TUs to produce transform coefficients for the CU.

Following any transforms to produce transform coefficients, video encoder 20 or video decoder 30 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 or video decoder 30 may utilize a predefined scan order to scan the quantized transform coefficients to produce a serialized vector that can be entropy encoded. In other examples, video encoder 20 or video decoder 30 may perform an adaptive scan. After scanning the quantized transform coefficients to form a one-dimensional vector, video encoder 20 or video decoder 30 may entropy encode the one-dimensional vector, e.g., according to context-adaptive binary arithmetic coding (CABAC). Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
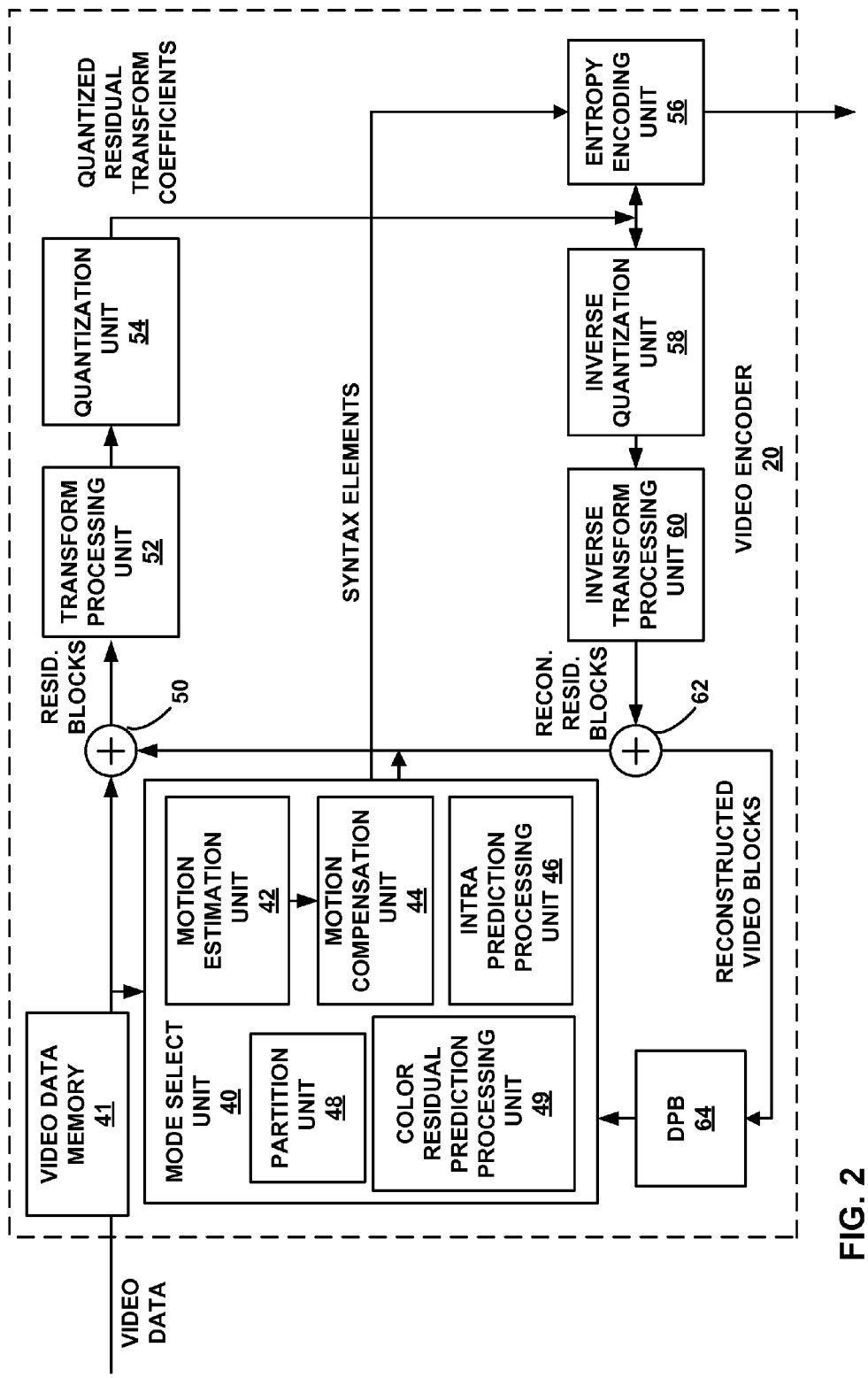
FIG. 2 is a block diagram illustrating an example video encoder that may implement the techniques described in this disclosure.

FIG. 2 is a block diagram illustrating an example of a video encoder that may implement the techniques described herein. In the example of FIG. 2, video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes. In addition, video encoder 20 may be configured to perform color residual prediction in accordance with the techniques of this disclosure.

As shown in FIG. 2, video encoder 20 receives video data, including a current video block within a video frame to be encoded. In the example of FIG. 2, video encoder 20 includes video data memory 41, mode select unit 40, decoded picture buffer (DBP) 64, summer 50, transform processing unit 52, quantization unit 54, and entropy encoding unit 56. Mode select unit 40, in turn, includes motion compensation unit 44, motion estimation unit 42, intra-prediction processing unit 46, color residual prediction processing unit 49 and partition unit 48. For video block reconstruction, video encoder 20 also includes inverse quantization unit 58, inverse transform processing unit 60, and summer 62. An in-loop filtering unit (not shown in FIG. 2) may also be included to deblocking filtering, sample adaptive offset (SAO) filtering, or other types of in-loop filtering. If desired, the in-loop filtering unit would typically filter the output of summer 62.

Video data memory 41 may store video data to be encoded by the components of video encoder 20. The video data stored in video data memory 41 may be obtained, for example, from video source 18. DPB 64 is one example of a decoded picture buffer that stores reference video data for use in encoding video data by video encoder 20 (e.g., in intra- or inter-coding modes, also referred to as intra- or inter-prediction coding modes). Video data memory 41 and DPB 64 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 41 and DPB 64 may be provided by the same memory device or separate memory devices. In various examples, video data memory 41 may be on-chip with other components of video encoder 20, or off-chip relative to those components.

During the encoding process, video encoder 20 receives a video frame, tile, or slice to be coded. A frame or picture may be partitioned into slices and tiles, as well as video blocks within slices or tiles, by partition unit 48. Motion estimation unit 42 and motion compensation unit 44 perform inter-predictive coding of the received video block relative to one or more blocks in one or more reference frames to provide temporal prediction. Intra-prediction processing unit 46 may additionally or alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs (CTUs), and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference picture. Mode select unit 40 also provides syntax elements, such as motion vectors, intra-mode indicators, partition information, and other such syntax information, to entropy encoding unit 56. The syntax information may be included within the encoded bitstream, such as within slice headers or parameter sets.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. In the context of inter-prediction, a motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in DPB 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 may determine one or more reference pictures, that video encoder 20 may use to predict the pixel values of one or more PUs that are inter-predicted. Motion estimation unit 42 may store the reference pictures in a decoded picture buffer (DPB) until the pictures are marked as unused for reference. Mode select unit 40 of video encoder 20 may encode various syntax elements that include identifying information for one or more reference pictures.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra prediction processing unit 46 may perform intra-prediction on a current block, as an alternative to the inter-prediction performed by motion estimation unit 42 and motion compensation unit 44, as described above. In particular, intra prediction processing unit 46 may determine an intra-prediction mode to use to encode a current block. In some examples, intra prediction processing unit 46 may encode a current block using various intra-prediction modes, e.g., during separate encoding passes, and intra prediction processing unit 46 (or mode select unit 40, in some examples) may select an appropriate intra-prediction mode to use from the tested modes.

After selecting an intra-prediction mode for a block, intra prediction processing unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data, e.g., matrix subtraction of the prediction block, from the original video block being coded. Summer 50 represents the component or components that perform this subtraction operation. Regardless of whether inter-prediction or intra-prediction was used to form the residual block, video encoder 20 may use color residual prediction processing unit 49 to further predict residual values for chroma components of the residual block using reconstructed luma residual values (i.e., inverse quantization and inverse transform) as predictors. It should be noted that video encoder 20 may use either the original luma residual values or reconstructed luma residual values to perform color residual prediction. Video encoder 20 uses reconstructed luma residual values to perform color residual prediction. Techniques of this disclosure for performing color residual prediction will be described in more detail below.

Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used.

In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive binary arithmetic coding (CABAC) or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform processing unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of DPB 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in DPB 64. The reconstructed video block may be used by motion estimation unit 42 and motion compensation unit 44 as a reference block to inter-code a block in a subsequent video frame.

Figure 3:
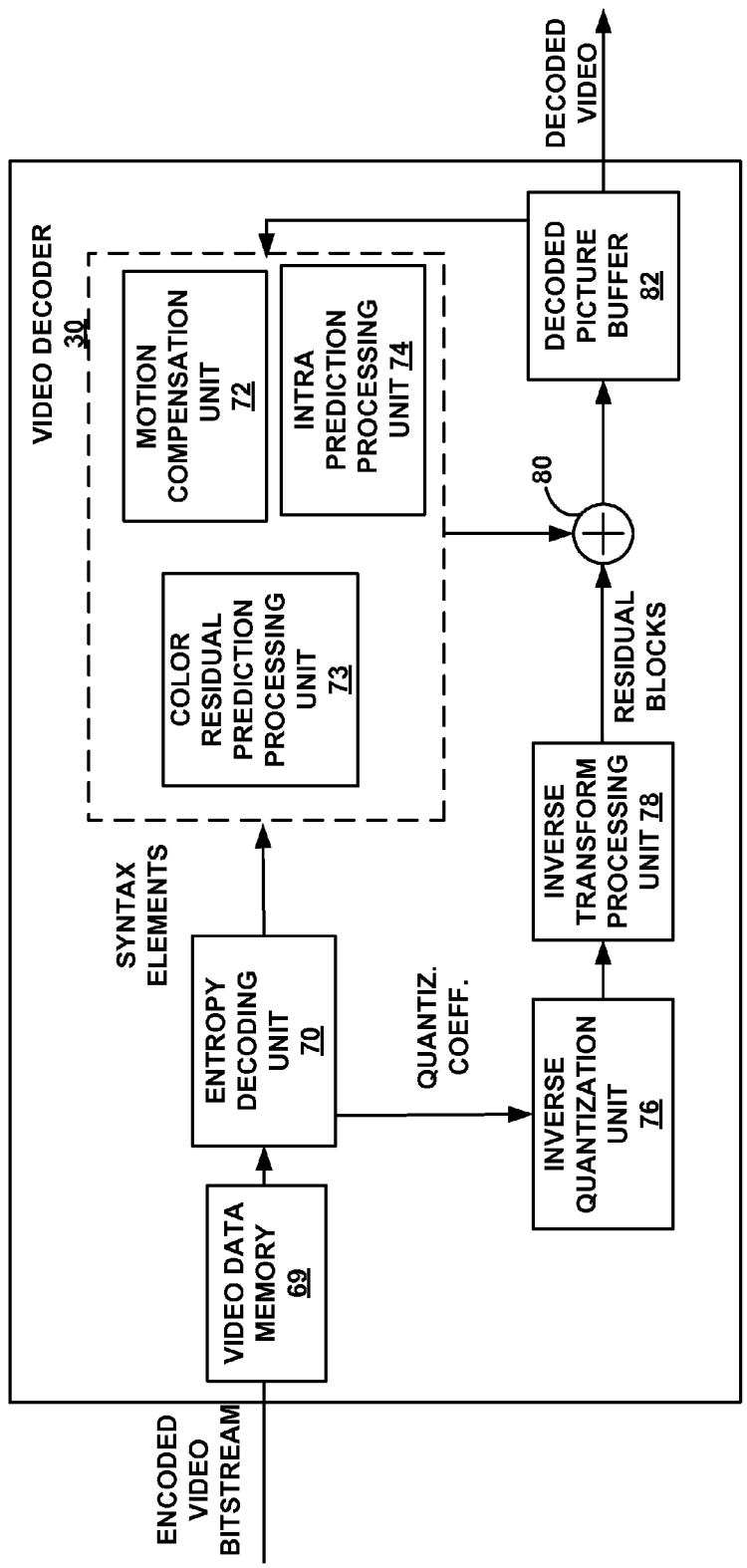
FIG. 3 is a block diagram illustrating an example video decoder that may implement the techniques described in this disclosure.

FIG. 3 is a block diagram illustrating an example of video decoder 30 that may implement techniques described herein. In the example of FIG. 3, video decoder 30 includes video data memory 69, entropy decoding unit 70, motion compensation unit 72, color residual prediction processing unit 73, intra prediction processing unit 74, inverse quantization unit 76, inverse transformation processing unit 78, decoded picture buffer (DPB) 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra prediction processing unit 74 may generate prediction data based on intra-prediction mode indicators received from entropy decoding unit 70.

Video data memory 69 may store video data, such as an encoded video bitstream, to be decoded by the components of video decoder 30. The video data stored in video data memory 69 may be obtained, for example, from a storage device, from a local video source, such as a camera, via wired or wireless network communication of video data, or by accessing physical data storage media. Video data memory 69 may form a coded picture buffer (CPB) that stores encoded video data from an encoded video bitstream.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level. In some examples, syntax elements may be included in a slice header, or a picture parameter set referred to (directly or indirectly) by the slice header When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in DPB 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 and/or intra prediction processing unit 74 may also perform interpolation based on interpolation filters. Motion compensation unit 72 and/or intra prediction processing unit 74 may use interpolation filters as used by video encoder 20 during encoding of the video blocks to calculate interpolated values for sub-integer pixels of reference blocks. In this case, motion compensation unit 72 and/or intra prediction processing unit 74 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform processing unit 78 applies an inverse transform, e.g., an inverse DCT, an inverse integer transform, or a conceptually similar inverse transform process, to the transform coefficients in order to produce residual blocks in the pixel domain.

After motion compensation unit 72 and/or intra prediction processing unit 74 generates the predictor block for the current video block based on the motion vectors and other syntax elements, video decoder 30 forms a decoded video block by summing the residual blocks from inverse transform processing unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in decoded picture buffer 82, which stores reference pictures used for subsequent motion compensation. Decoded picture buffer 82 also stores decoded video for later presentation on a display device, such as display device 32 of FIG. 1.

Regardless of whether inter-prediction or intra-prediction was used to reconstruct the residual blocks, video decoder 30 may use color residual prediction processing unit 73 to further predict residual values for chroma components of the residual block using reconstructed luma residual values (i.e., inverse quantization and inverse transform) as predictors. Techniques of this disclosure for performing color residual prediction will be described in more detail below.

The following section of the disclosure will discuss techniques for color residual prediction. Initially, color formats, including chroma sub-sampling formats, for video blocks will be discussed. Video blocks (e.g., a CU or a PU) may include a luminance component, which may be denoted as Y, as well as two chroma components, which may be denoted as Cr and Cb. Depending on the chroma sub-sampling format used, the number of Cr and Cb components in a block may be the same as or different from the number of Y components (typically fewer Cr and Cb components than Y components).

In one proposal for HEVC, the luma and chroma components of a pixel are coded in a 4:2:0 chroma sub-sampling format. In a 4:2:0 chroma sub-sampling format, for every 4×2 block of pixels, there are eight luma components (four in each row) and two chroma components (e.g., one Cr chroma component and one Cb chroma component in the first row of the 4×2 block). The second row of the 4×2 block would have no chroma information. As such, in a 4×2 block of pixels, the chroma components are sampled at ½ horizontal resolution and ½ vertical resolution.

Video coding techniques are not limited to 4:2:0 chroma sub-sampling. Other chroma sub-sampling formats may be used, including 4:2:2 and 4:4:4. In a 4:2:2 chroma sub-sampling format, for every 4×2 block of pixels, there are eight luma components (four in each row) and four chroma components (e.g., one Cr chroma component and one Cb chroma component in each of the first and second rows of the 4×2 block). As such, for a 4:2:2 chroma sub-sampling format, the chroma components are sampled at ½ horizontal resolution and full vertical resolution.

The 4:4:4 chroma sub-sampling format involves no sub-sampling of chroma components. That is, for a 4×2 block of pixels, there are eight luma components, eight Cr components, and eight Cb components.

Figure 4:
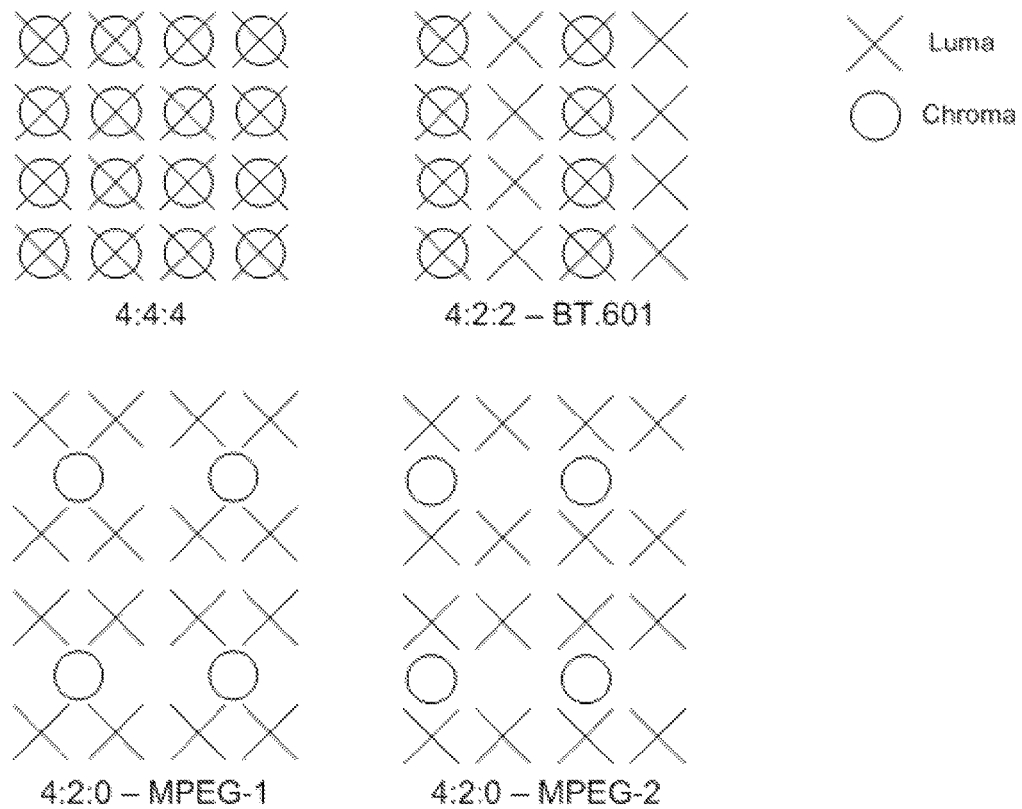
FIG. 4 is a conceptual diagram illustrating chroma sub-sampling formats.

FIG. 4 shows examples of 4:2:0, 4:2:2, and 4:4:4 sub-sampling formats. As shown in FIG. 4, luma components of a video block are labeled with an X and the chroma components (i.e., both Cr and CB) are labeled with an O. For the 4:4:4 chroma sub-sampling format there is a luma component in the same position as every chroma component. That is every pixel has both luma and chroma components. For the example 4:2:2 chroma sub-sampling format shown in FIG. 4 (e.g., as defined by International Telecommunication Union (ITU) BT.601 specification), there are luma components for every pixel, but chroma components are only present for every other pixel. Chroma values for pixels not having a corresponding chroma component are either copied from a neighboring pixel, or averaged from two or more neighboring pixels.

FIG. 4 further shows two example 4:2:0 chroma sub-sampling formats. In a 4:2:0 chroma sub-sampling format there is a single pair of chroma components for every four luma components. In addition, the luma components do not directly overlap (i.e., are not in the same position) any of the chroma components. For example, as defined by the MPEG-1 standard, chroma components in the 4:2:0 chroma sub-sampling format are in the middle of four adjacent luma components. For the 4:2:0 chroma sub-sampling format defined by the MPEG-2 standard, the chroma components are directly between two luma components in a column.

The Range Extension (RExt) of HEVC includes proposals for performing video coding using color spaces other than YCbCr 4:2:0, such as YCbCr 4:2:2, YCbCr 4:4:4, and RGB 4:4:4. The RExt of HEVC is described in more detail in D. Flynn, J. Sole, and T. Suzuki, "High Efficiency Video Coding (HEVC) Range Extensions text specification: Draft 4", JCTVC-N1005_v3, August 2013, available at phenix.int-evry.fr/jct/doc_end_user/documents/14_Vienna/wg11/JCTVC-N1005-v3 .zip, and is incorporated by reference herein in its entirety.

To improve coding efficiency with less color distortion, a prediction process or color transform may be applied adaptively during video encoding and decoding. The color prediction process or color transform may be applied to each block adaptively by signaling or deriving appropriate information for each block.

In one proposal for the RExt of HEVC, an example color transform is called inter component residual prediction or color residual prediction. In color residual prediction, chroma residual components, i.e., chroma residual data indicating differences between predicted chroma values and actual chroma values, of a video block are further predicted from corresponding reconstructed luma residual components. In some examples, the reconstructed luma residual components are scaled prior to being used as predictors. The scaling factor may be signaled for each block.

A video coder (e.g., video encoder 20 and/or video decoder 30) may perform the techniques of this disclosure for color residual prediction after the video coder finishes parsing and inversely transforming any blocks of transform coefficients to obtain a luma residual block and chroma residual blocks (e.g., a Cr residual block and a Cb residual block). In this disclosure, a block of luma residual samples is denoted as:

$R_L(x,y)$.

The block of luma residual samples may be obtained by video decoder 30 by inverse transforming a corresponding block of transform coefficients for a luma residual block. Video decoder 30 may use this block of luma residual samples to reconstruct a luma block. For example, video decoder 30 may sum the pixel difference values provided by luma residual samples with corresponding predictive luma pixel samples to reconstruct a block of luma pixel samples.

A predictor of a block of chroma residual samples likewise may be obtained by 30 video decoder by inverse transforming a corresponding block of transform coefficients for a chroma residual block. A final or updated residual block of chroma residual samples is denoted as:

$R_C(x,y)$

Video decoder 30 may use this final or updated block of chroma residual samples to reconstruct a chroma block. For example, video decoder 30 may sum the pixel difference values provided by final or updated block of chroma residual samples with corresponding predicted chroma pixel samples to reconstruct a block of chroma pixel samples.

This disclosure also introduces the concept of a predicted block of chroma residual samples, denoted as:

$R_{Cp}(x,y)$.

The predicted block of chroma residual samples may include residual samples that represent a difference between the final or updated chroma residual samples and a version of the luma residual samples, e.g., such as a version that is scaled with a scale factor and/or offset with an offset value relative to the luma residual samples.

Video encoder 20 may encode, and video decoder 30 may decode, the block of luma residual values and the predicted block of chroma residual samples, and one or more scaling or offset values. Video decoder 30, e.g., using color residual prediction processing unit 73, may determine the final or updated block of chroma residual samples based on the predicted block of chroma residual samples and a version of the block of luma residual samples, e.g., such as a scaled and/or offset version of the block of luma residual samples.

Video decoder 30, e.g., using motion compensation unit 72 or intra prediction processing unit 74, may then use the final or updated block of chroma residual samples to reconstruct a block of chroma pixel samples. For example, video decoder 30 may sum the final or updated block of chroma residual samples with a block of predicted chroma pixel samples to reconstruct a block of chroma pixel samples. Video encoder 20 may determine and encode the predicted block of chroma residual samples by subtracting a version of the block of luma residual samples, such as a scaled or offset version of the block of luma residual samples, from an original block of chroma residual samples. For each of the blocks of luma or chroma samples described above, x and y denote variables that indicate the pixel location in the picture of the block relative to the top-left corner of a frame of video, also referred to as a picture.

Video encoder 20, e.g., using color residual prediction processing unit 49, configured in accordance with the techniques of this disclosure may be configured to determine a scaling factor for one or more coding blocks of a coding unit (CU) of video data. The scale factor may be indicative of a correlation between the luma residual block and a chroma residual block of a PU of the CU. In some examples, color residual prediction processing unit 49 may apply the scaling factor to values of the luma residual block to produce scaled luma residual samples. Color residual prediction processing unit 49 may subtract the scaled luma residual samples from a block of original chroma residual samples to produce a block of predicted chroma residual samples.

Video encoder 20 may encode the scaling factor, as well as the predicted block of chroma residual samples in a coded video bitstream. Encoding the predicted block of chroma residual samples, the luma residual samples, and scale factor may improve the bitstream efficiency of coding chroma residual samples relative to encoding the original block of chroma residual samples. In other examples of the disclosure, the scaling factor is not signaled, but is rather stored or otherwise inferred at video decoder 30.

In a reciprocal process, video decoder 30, e.g., using color residual prediction processing unit 73, configured in accordance with the techniques of this disclosure may receive a scaling factor, a block of luma residual samples, and a predicted block of chroma residual samples for a CU in a coded video bitstream. In some examples, color residual prediction processing unit 73 may multiply the scaling factor by each of the samples of the block of luma residual samples, and quantize the resulting product to produce quantized luma residual samples. Color residual prediction processing unit 73 may then update the predicted block of chroma residual samples by summing or combining the quantized luma residual samples resulting from the scaling and quantizing operations with the predicted block of chroma residual samples to produce an updated block of chroma residual samples, which may be considered a final block of chroma residual samples. Video decoder 30 may use the updated block of chroma residual samples in combination with predicted chroma pixel samples to determine the final pixel values of the CU. In some examples, video decoder 30 may receive different scaling factors for different chroma components.

In some examples, video encoder 20 and/or video decoder 30 may be further configured to determine/receive an offset value. For example, video decoder 30 may receive the offset in the coded video bitstream and color residual prediction processing unit 73 may be configured to add the offset value to the scaled luma residual samples and the predicted chroma residual samples to produce the updated chroma residual samples. Video encoder 20, e.g., using color residual prediction processing unit 49, may determine the offset value, and subtract the offset value and the scaled luma residual samples from a block of chroma residual samples to determine a block of predicted chroma residual samples. In this example, video encoder 20 may encode the offset value, in addition to the scaling factor, the luma residual samples, and the predicted chroma residual samples in the coded video bitstream.

The process described above with respect to determining a scaling factor, chroma residual samples, updated luma samples, and updated chroma samples may apply to both chroma components (Cb and Cr). That is, video encoder 20 and/or video decoder 30 may use the same process color residual prediction process for each chroma component. In some example, the same scaling factor is used for each chroma component. In other examples, video encoder 20 determines a separate scaling factor for each chroma component.

Video encoder 20 and video decoder 30 may be configured to perform color residual prediction for video blocks coded with either intra-prediction or inter-prediction. For example, if a CU is intra-predicted, a chroma block of the CU may have a different intra prediction mode as compared to the luma component. When the luma and chroma components have different intra-prediction modes, the correlation between their residual signals may be weak. Accordingly, in some examples, video encoder 20 and video decoder 30 may only enable inter-color component residual prediction if a luma sample block and a chroma sample block have the same intra-prediction mode, e.g., the same intra-prediction mode among the 35 possible intra-prediction modes in HEVC. An intra-coded CU may include a syntax element, intra_chroma_pred_mode[x0][y0], which may indicate the intra-prediction mode for each color component of the CU.

In another example of the disclosure, video encoder 20 and video decoder 30 may only enable color residual prediction if the chroma and luma samples of a block are encoded using the same intra-prediction direction, e.g., the same angular intra-prediction direction. In one example, video encoder 20 and video decoder 30 may only enable color residual prediction if the chroma and luma samples of a block are encoded using the same identical intra-prediction direction. In another example, video encoder 20 and video decoder 30 may only enable color residual prediction if the chroma and luma samples of a block are encoded using the same general intra-prediction direction (e.g., chroma and luma samples are both coded using a generally vertical, generally diagonal, or generally horizontal inter-prediction direction). Similarly, video encoder 20 and video decoder 30 may determine whether color residual prediction is enabled for a particular block based on whether chroma samples and luma samples for a block have the same intra-prediction mode or intra-prediction direction. In some examples, video encoder 20 and video decoder 30 may enable intra-color component residual prediction if the syntax element intra_chroma_pred_mode[xCb][yCb]==4 (i.e., indicates that a chroma block of a CU uses angular intra-prediction).

In another example of the disclosure, color residual prediction processing unit 49 may determine a scaling factor ($\alpha$), based on a correlation between a block of luma residual samples and a block of chroma residual samples. Color residual prediction processing unit 49 may determine a rate-distortion cost associated with a scaling factor equal to zero. Color residual prediction processing unit 49 may then determine a list of scaling factor candidates, and select the scaling factor value from the list of candidates such that the selected candidate scaling factor for a block minimizes a squared error for the block. Color residual prediction processing unit 49 may calculate the squared error as: (chroma_residuals−luma_residuals*alpha)$^2$, wherein chroma_residuals denotes a chroma residual block, and luma_residuals denotes a luma residual block. Color residual prediction processing unit 49 may select either a scaling factor equal to zero, or the candidate scaling factor from the list such that the selected zero scaling factor or list scale factor minimizes a rate-distortion cost relative to other scaling factors.

In some examples, color residual prediction processing unit 49 may select the scaling factor from nine possible candidate scale factors: {−8, −4, −2, −1, 0, 1, 2, 4, 8} such that the selected scaling factor minimizes a rate-distortion cost. During intra- or inter-prediction, color residual prediction processing unit 49 may calculate a predicted block of chroma residual samples for a CU based on the scaling factor and the block of luma residual samples, and signal the predicted block and the scaling factor in a coded video bitstream. Video decoder 30 may decode the scaling factor, the predicted block of chroma residual samples, and the block of luma residual samples, and color residual prediction processing unit 73 may use the scaling factor, the predicted block of chroma residual samples, and the block of luma residual samples to determine an updated block of chroma residual samples.

In some examples where a CU has a YCbCr 4:4:4 chroma subsampling format, color residual prediction processing unit 73 may use the scaling factor, the predicted block of chroma residual samples, and luma residual samples to calculate a block of chroma residual samples as in equation 1:

$$R_C(x,y) = R_{C_P}(x,y) + (\alpha \cdot R_L(x,y)) \gg N \qquad (1),$$

where $R_c$ is the block of chroma residual samples, and $R_{cp}$ is the predicted block of chroma residual samples, α is a scale factor, and $R_L$ is the block of luma residual samples. In this example, N is a non-negative integer constant parameter, α is an integer scaling factor parameter signaled in the bitstream or inferred by video decoder 30. Color residual prediction processing unit 73 may utilize the right shift operation ("»") to quantize α, e.g., to ensure that the resulting offset value is an integer value, as well as to reduce computational complexity. Color residual prediction processing unit 73 may also apply other quantization schemes to quantize the product of the luma residual samples and the scaling factor.

In some examples, where a CU has a YCbCr 4:4:4 chroma subsampling format, color residual prediction processing unit 49 configured in accordance with the techniques of this disclosure may apply a process that is generally reciprocal to that described in equation 1 to calculate a predicted chroma residual sample block. For example, color residual prediction processing unit 49 may calculate the predicted chroma residual block according to equation 2:

$$R_{Cp}(x,y) = R_C(x,y) - (\alpha \cdot R_L(x,y)) \gg N \quad (2),$$

where $R_{cp}$ on the left-hand side of equation 2 is the block of predicted chroma residual block samples, and $R_c$ is a block of original chroma residual samples.

In some further examples, color residual prediction processing unit 49 may be further configured to calculate an offset value and encode the additional offset value in a coded video bitstream. Color residual prediction processing unit 49 may subtract the offset value from a block of chroma residual samples to calculate a block of predicted chroma residual samples according to the following equation (3):

$$R_{Cp}(x,y) = R_C(x,y) - b - (\alpha \cdot R_L(x,y)) \gg N \quad (3),$$

where b is the offset value.

In some examples, color residual prediction processing unit 73 may perform a generally reciprocal process when a CU has a 4:4:4 chroma subsampling. In these examples, color residual prediction processing unit 73 may receive an offset value, a scaling factor, a block of predicted chroma residual samples, and luma residual samples of the block. Color residual prediction processing unit 73 may calculate the updated chroma residual samples based on the aforementioned received syntax elements according to the following equation (4):

$$R_C(x,y) = R_{Cp}(x,y) + b + (\alpha \cdot R_L(x,y)) \gg N \quad (4).$$

In the RExt of HEVC, color residual prediction is supported for 4:4:4 video coding where the chroma residual signal can be predicted from the scaled luma residual signal. In general, as discussed above, color residual prediction involves predicting the residual of chroma components from the residual of luma components. As such, rather than coding (e.g., transform, quantization, and CABAC) the chroma residual, the chroma residual is first subtracted from the luma residual, and that resultant value is coded. In some situations, performing color residual prediction leads to better coding efficiency than coding the chroma component residuals independently.

In a case of 4:4:4 chroma sub-sampling, the block sizes of luma and chroma may be the same (i.e., there are the same number of chroma and luma components). However, in 4:2:2 and 4:2:0 chroma sub-sampling formats, the block sizes between luma components and chroma components are usually different, as the chroma samples are downsampled. Since luma pixels may not be directly aligned to all (or any) chroma pixels, e.g., as shown in FIG. 4, the choice of which luma residual samples to use as predictors is not self-evident. As such, it may be beneficial to determine a subset of the total number of luma residuals in a block that may be used as predictors (referred to as luma predictors in this disclosure) for chroma residual samples. In this disclosure, techniques for performing color residual prediction for 4:2:2 and 4:2:0 sub-sampling formats are disclosed.

In general the techniques of this disclosure involve coding a block of video data having one of a 4:2:0 or a 4:2:2 chroma sub-sampling format using color residual prediction. In the following examples of the disclosure, video encoder 20 may be configured to perform a color residual prediction process to encode a block of predicted chroma residual values data using a subset of reconstructed luma residual values as luma predictors for the block of chroma residual values. Likewise, video decoder 30 may be configured to perform a color residual prediction process to decode and reconstruct a block of chroma residual values data using a subset of reconstructed luma residual values as luma predictors for a block of predicted chroma residual values.

As described above, the color residual prediction process performed by video encoder 20 may include scaling the luma predictors to form scaled luma predictors and subtracting the scaled luma predictors from the chroma residual values. Likewise, video decoder 30 may be configured to scale the luma predictors to form scaled luma predictors and add the scaled luma predictors to the predicted chroma residual values. Scaling may be applied in each of the examples below.

Figure 5A:
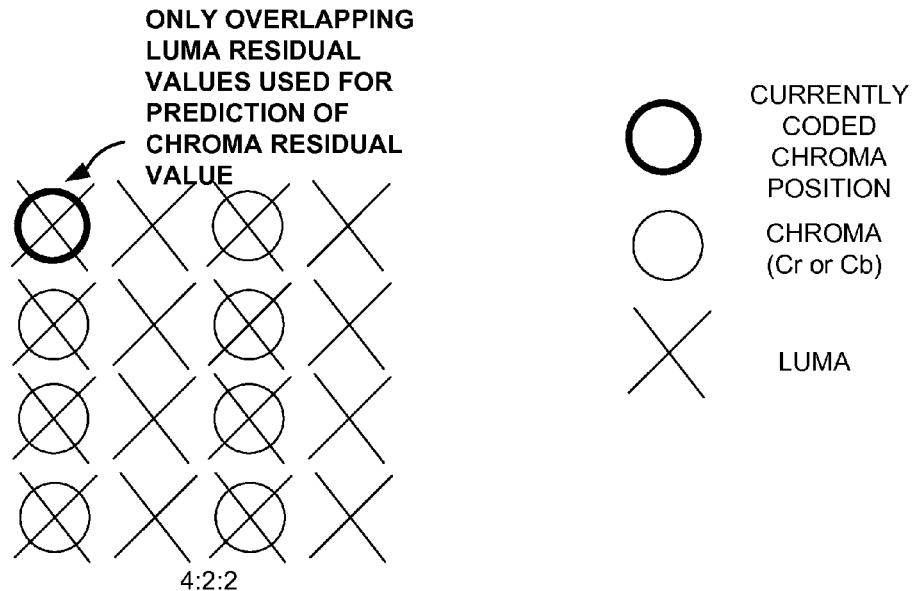
FIG. 5A is a conceptual diagram illustrating one example of luma predictors for chroma residual values in a 4:2:2 chroma sub-sampling format.

In one example of the disclosure, in the case of a 4:2:2 chroma sub-sampling format, to perform color residual prediction, the subset of reconstructed luma residual values used as luma predictors are the luma residual values that are in the same pixel position as the chroma components corresponding to a chroma residual value (i.e., the luma and chroma components overlap). FIG. 5A shows an example where the luma predictor for a currently coded chroma residual value includes a luma pixel overlapping with a currently coded chroma residual value in 4:2:2 chroma sub-sampling format. In this example, color residual prediction processing unit 49 is configured to scale and subtract the reconstructed luma residual value at the same position as the chroma residual value from chroma residual value to produce a predicted chroma residual value. Likewise, color residual prediction processing unit 73 may be configured to scale and add the reconstructed luma residual value at the same position as the predicted chroma residual value to the predicted chroma residual value to produce a chroma residual This process may be completed for both the Cr component and the Cb component.

As described above, the scaling factor used may be the same for both the Cr component and the Cb component, or color residual prediction processing unit 49 may determine and signal a separate scaling factor for each of the Cr component and the Cb component, e.g., based on different rate-distortion determinations for Cr and Cb components. Color residual prediction processing unit 49 may determine scaling factors at one or more of a block level, slice level, picture level, or sequence level.

In another example of the disclosure, in the case of a 4:2:2 chroma sub-sampling format, to perform color residual prediction, the subset of reconstructed luma residual values used as luma predictors include luma residual values that are in the same pixel position as the chroma components corresponding to a chroma residual value and at least one other luma residual value for each chroma residual value. That is, to predict a particular chroma residual value, the overlapping luma residual value and at least one other luma residual value are used as luma predictors. That actual predictive luma value used may be an average of the overlapping luma residual value and the at least one other luma residual value. Color residual prediction processing unit 49 and color residual prediction processing unit 73 may use either a simple average or a weighted average to determine the actual predictive luma value. For example, it may be beneficial to use a higher weight for the luma residual value that overlaps with (i.e., is in the same position) as the chroma residual value, than for the at least one other residual value.

Figure 5B:
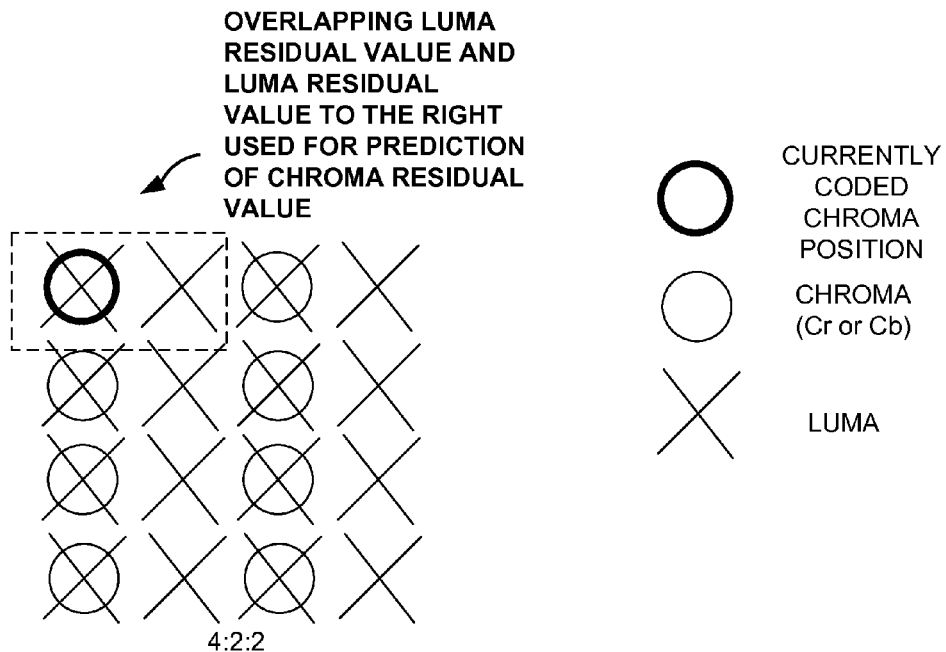
FIG. 5B is a conceptual diagram illustrating one example of luma predictors for chroma residual values in a 4:2:2 chroma sub-sampling format.

FIG. 5B shows an example where the luma predictors for a currently coded chroma residual value include two luma residual values: the luma residual value in the same position as the currently coded chroma residual value and the luma residual value immediately to the right of the currently coded chroma residual value. In the example of FIG. 5B, the at least one other luma residual value is the luma residual value immediately to the right of the currently coded chroma residual value. In other examples, the at least one other luma residual value may be immediately above, below, or to the left of the currently coded chroma residual value.

Figure 5C:
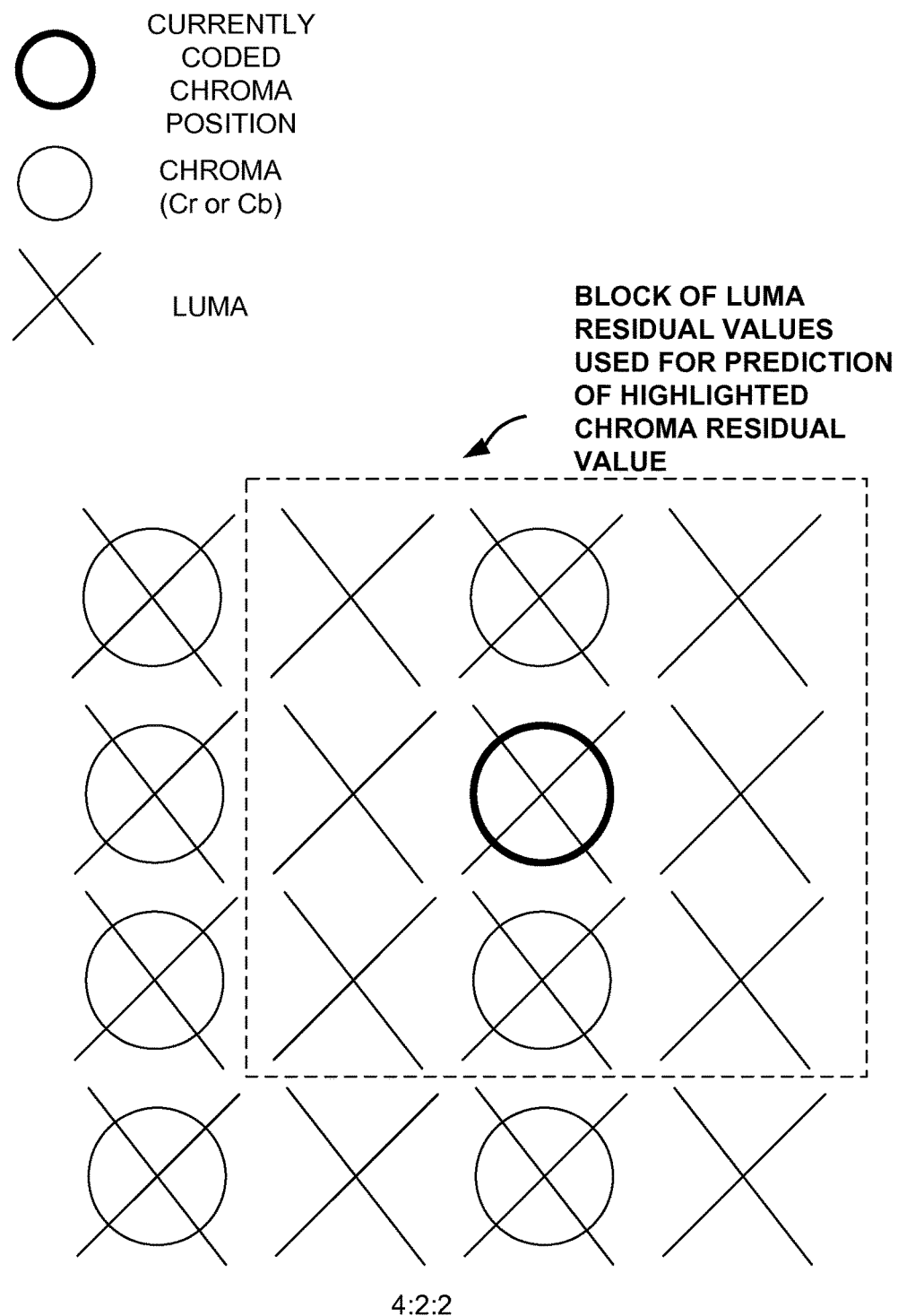
FIG. 5C is a conceptual diagram illustrating one example of luma predictors for chroma residual values in a 4:2:2 chroma sub-sampling format.

FIG. 5C shows an example where the luma predictors for a currently coded chroma residual value, in the case of a 4:2:2 chroma sub-sampling format, includes more than two luma residual values. In the example of FIG. 5B, the at least one other luma residual value includes the eight luma residual values immediately surrounding the currently coded chroma residual value. Accordingly, the total number of luma residual values used to predict a single chroma residual value is nine, including the luma residual value in the same position as the chroma residua value and the eight luma residual values immediately surrounding the currently coded chroma residual value (i.e., a 3×3 block around the currently coded chroma residual value). Again, the nine luma residual values (i.e., the luma predictors) shown in FIG. 5C may be scaled and averaged. Color residual prediction processing unit 49 and color residual prediction processing unit 73 may average the luma predictors using a simple average, a weighted average, or another type of averaging process. If a weighted average is used, color residual prediction processing unit 49 may be configured to signal the weights.

In other examples of the disclosure, color residual prediction processing unit 49 and color residual prediction processing unit 73 may use a different number and different positions of luma predictors to code a chroma residual value using color residual prediction.

In another example of the disclosure, in case of a 4:2:0 chroma sub-sampling format, color residual prediction processing unit 49 and color residual prediction processing unit 73 may be configured to use one or more luma residual values adjacent to a currently coded chroma residual value to perform color residual prediction. This is because, as is shown in FIG. 4, there are no luma components that directly overlap a chroma component position in 4:2:0 chroma sub-sampling.

Figure 6A:
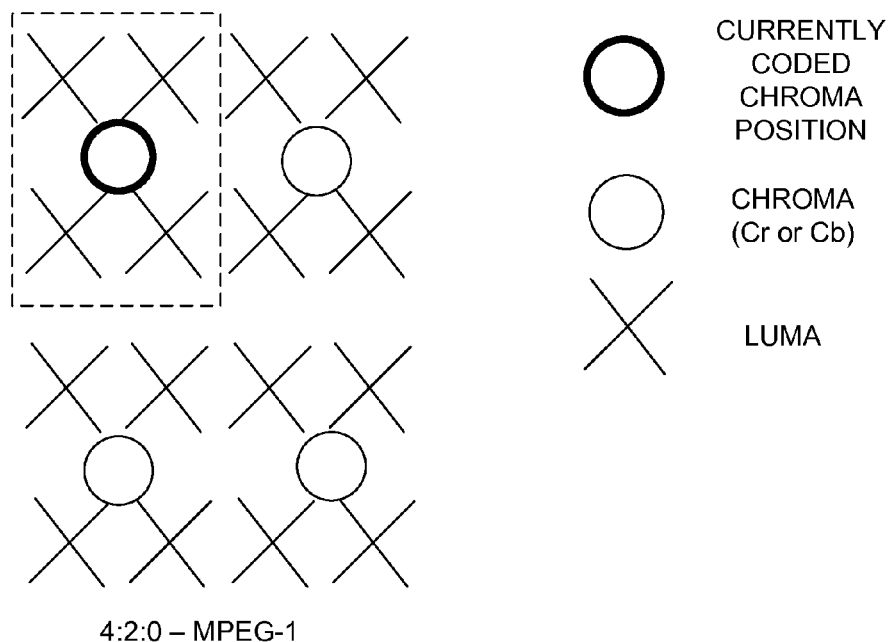
FIG. 6A is a conceptual diagram illustrating one example of luma predictors for chroma residual values in a 4:2:0 chroma sub-sampling format.
Figure 6B:
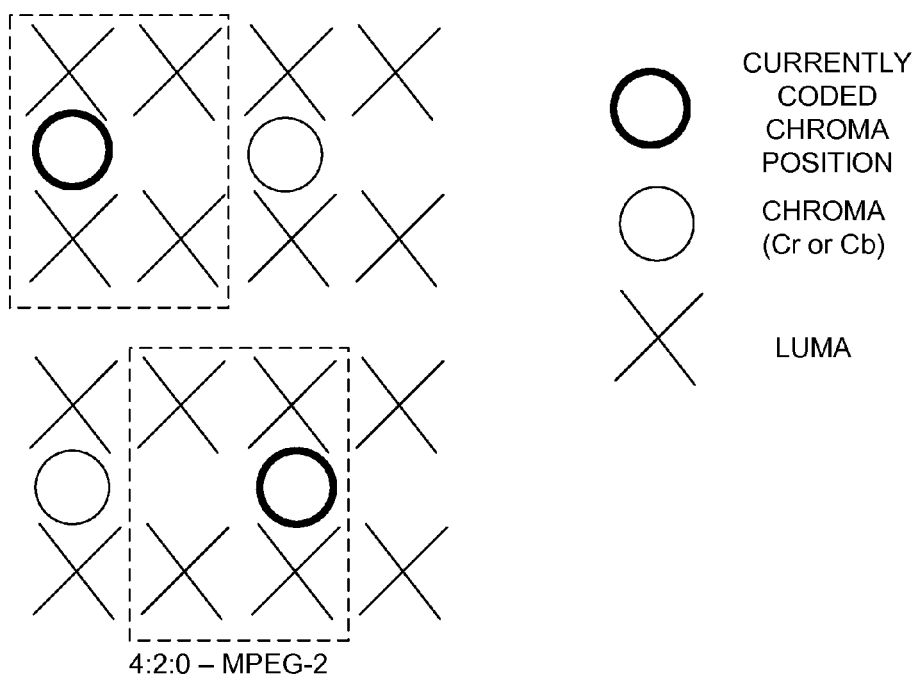
FIG. 6B is a conceptual diagram illustrating one example of luma predictors for chroma residual values in a 4:2:0 chroma sub-sampling format.

For example, in the case of MPEG-1 4:2:0 shown in FIG. 6A, four luma residual values around the currently coded chroma residual value may be used for color residual prediction. In another example, in the case of MPEG-2 4:2:0 shown in FIG. 6B, two luma residual values above and two luma residual values below each chroma residual value can be used as luma predictors for color residual prediction. In FIG. 6B, the four luma predictors used can include luma residual values to the right of the currently coded chroma residual value, or luma residual values to the left of the currently coded chroma residual value. Again, color residual prediction processing unit 49 and color residual prediction processing unit 73 may average the luma predictors using a simple average, a weighted average, or another type of averaging process. If a weighted average is used, color residual prediction processing unit 49 may be configured to signal the weights.

Figure 7A:
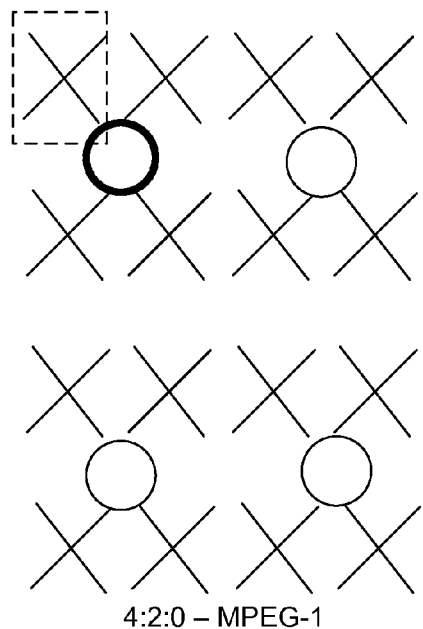
FIG. 7A is a conceptual diagram illustrating one example of luma predictors for chroma residual values in a 4:2:0 chroma sub-sampling format.
Figure 7B:
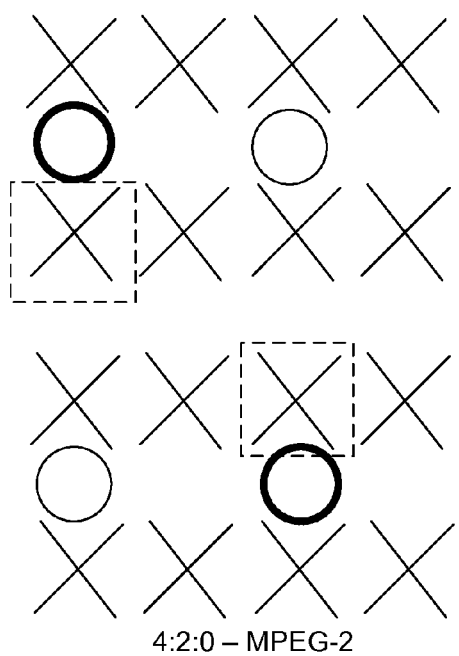
FIG. 7B is a conceptual diagram illustrating one example of luma predictors for chroma residual values in a 4:2:0 chroma sub-sampling format.

In another example of the disclosure, in case of 4:2:0 sub-sampling, only one luma residual value is used to predict the currently coded chroma residual value. The position of the luma residual value used as the luma predictor can be fixed (i.e., stored at each of video encoder 20 and video decoder 30) or may be signaled by video encoder 20 (i.e., adaptively selected). FIG. 7A shows one example, where the position of the luma predictor is at the top-left corner relative to the currently coded chroma residual value for MPEG-1 4:2:0 chroma sub-sampling format. However, any luma sample position may be used. FIG. 7B shows other examples for MPEG-2 4:2:0 chroma sub-sampling format, where the luma predictor may be above or below the currently coded chroma residual value.

The next section will discuss aspects of the disclosure that involve determining whether or not to perform color residual prediction for a block. In one example, color residual prediction processing unit 49 and color residual prediction processing unit 73 may determine whether or not to perform color residual prediction based on a luma coded block flag (cbf). A cbf flag is a flag that indicates whether or not there are any non-zero transform coefficients associated with residual data in a block. This cbf can be signaled for each color component separately. When there are no non-zero transform coefficients for a luma block (e.g., the cbf equals 0), the reconstructed luma residual value will be 0 or near zero for all pixels in the block. Therefore, using luma residual values as predictors will not result in any coding efficiencies, since all luma residual values are 0 or very near zero.

To exploit this situation, this disclosure proposes to configure color residual prediction processing unit 49 and color residual prediction processing unit 73 to check the luma cbf in order to determine whether or not to perform color residual prediction. If the luma cbf is 0 (i.e., no non-zero coded luma coefficients), no color residual prediction is performed. In this case, signaling of scaling factors or other information needed for color residual prediction may be skipped. If the luma cbf is 1 (i.e., there is at least one non-zero transform coefficients, and thus non-zero luma residuals), color residual prediction may be performed.

In another example of the disclosure, in the case of 4:2:2 sub-sampling, for the current K×K (width×height) chroma block, color residual prediction processing unit 49 and color residual prediction processing unit 73 may check a cbf related to the corresponding 2K×K luma block. If the cbf of the corresponding luma block is zero, no color residual prediction is performed for the K×K chroma block. Likewise, in the case of 4:2:0 sub-sampling, for the current K×K chroma block, color residual prediction processing unit 49 and color residual prediction processing unit 73 may check the cbf of the corresponding 2K×2K luma block. If the cbf of the corresponding luma block is zero, no color residual prediction is performed for the K×K chroma block.

In some circumstances, there can be a generally lower correlation between luma residual values and chroma residual values. In these cases, color residual prediction processing unit 49 and color residual prediction processing unit 73 may be configured to skip performing color residual prediction, as color residual prediction will provide minimal additional coding efficiencies. In one example of the disclosure, color residual prediction processing unit 49 and color residual prediction processing unit 73 may be configured to skip (i.e, not perform) color residual prediction for the current video block when the current video block has a luma transform unit (TU) size of less than or equal to 4×4. This is because, at small transform block sizes, the correlation between luma residuals and chroma residuals is small.

In another example of the disclosure, color residual prediction processing unit 49 and color residual prediction processing unit 73 may be configured to skip color residual prediction if different types of transforms are used for luma and chroma components. In another example of the disclosure, color residual prediction processing unit 73 may be configured to skip color residual prediction if different prediction modes are used to generate luma and chroma residual values.

Figure 8:
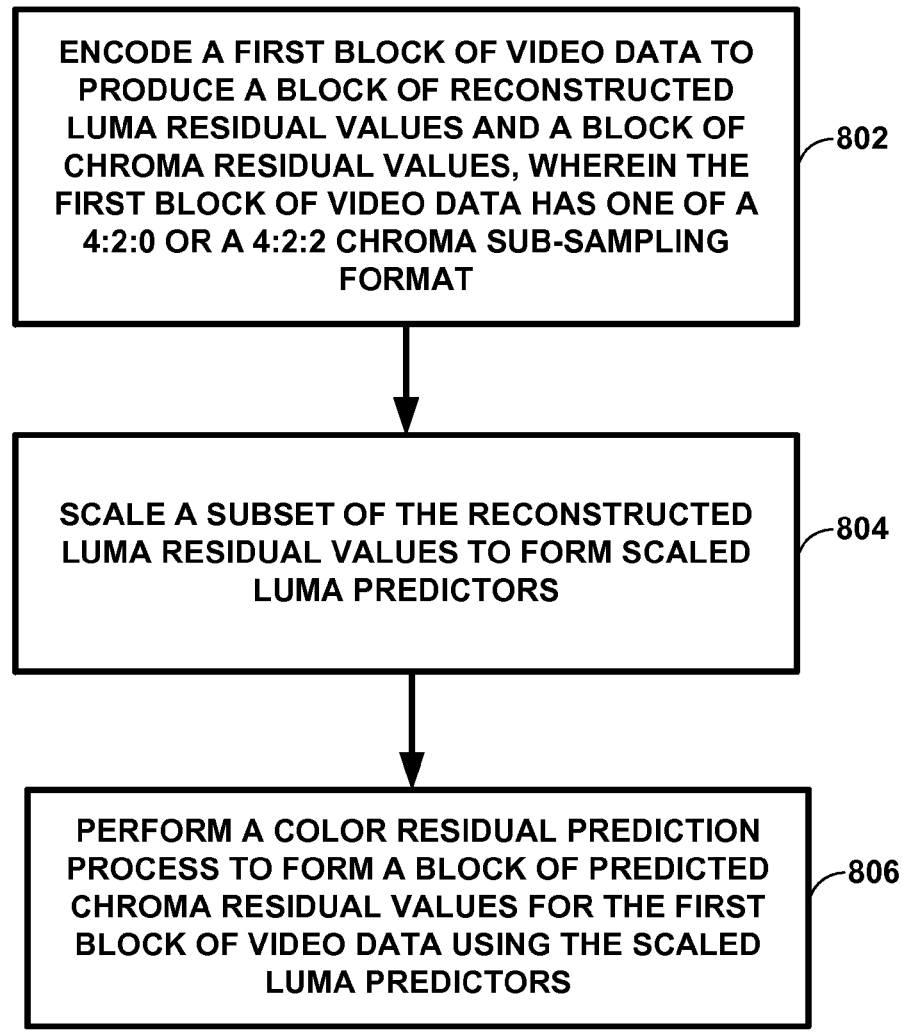
FIG. 8 is a flowchart illustrating an example encoding method of the disclosure.

FIG. 8 is a flowchart illustrating an example encoding method of the disclosure. The techniques of FIG. 8 may be implemented by video encoder 20, including color residual prediction processing unit 49.

In one example of the disclosure, video encoder 20 may be configured to encode a first block of video data to produce a block of reconstructed luma residual values and a block of chroma residual values (802). As discussed above, video encoder 20 may produce the luma residual values and chroma residual values using inter-prediction or intra-prediction. In accordance with the techniques of this disclosure, the first block of video data has one of a 4:2:0 or a 4:2:2 chroma sub-sampling format.

Color residual prediction processing unit 49 may be configured to scale a subset of the reconstructed luma residual values to form scaled luma predictors (804). As discussed with reference to FIGS. 5A-C, FIGS. 6A-B, and FIGS. 7A-B, the subset of reconstructed luma residual values used may differ based on the particular chroma sub-sampling format at used. Color residual prediction processing unit 49 may be configured to use one of the subsets of reconstructed luma residual values discussed above. As discussed above, for some subsets, color residual prediction processing unit 49 may be further configured to average two or more scaled reconstructed luma residual samples to form averaged scaled luma predictors.

Color residual prediction processing unit 49 may be further configured to perform a color residual prediction process to form a block of predicted chroma residual values for the first block of video data using the scaled luma predictors (806). Video encoder 20 may then be configured to entropy encode the luma residual values, the predicted chroma residual values, and any scaling factors used. In other examples, video encoder 20 does not signal the scaling factors, and instead, the scaling factors are inferred or otherwise determined at video decoder 30.

Figure 9:
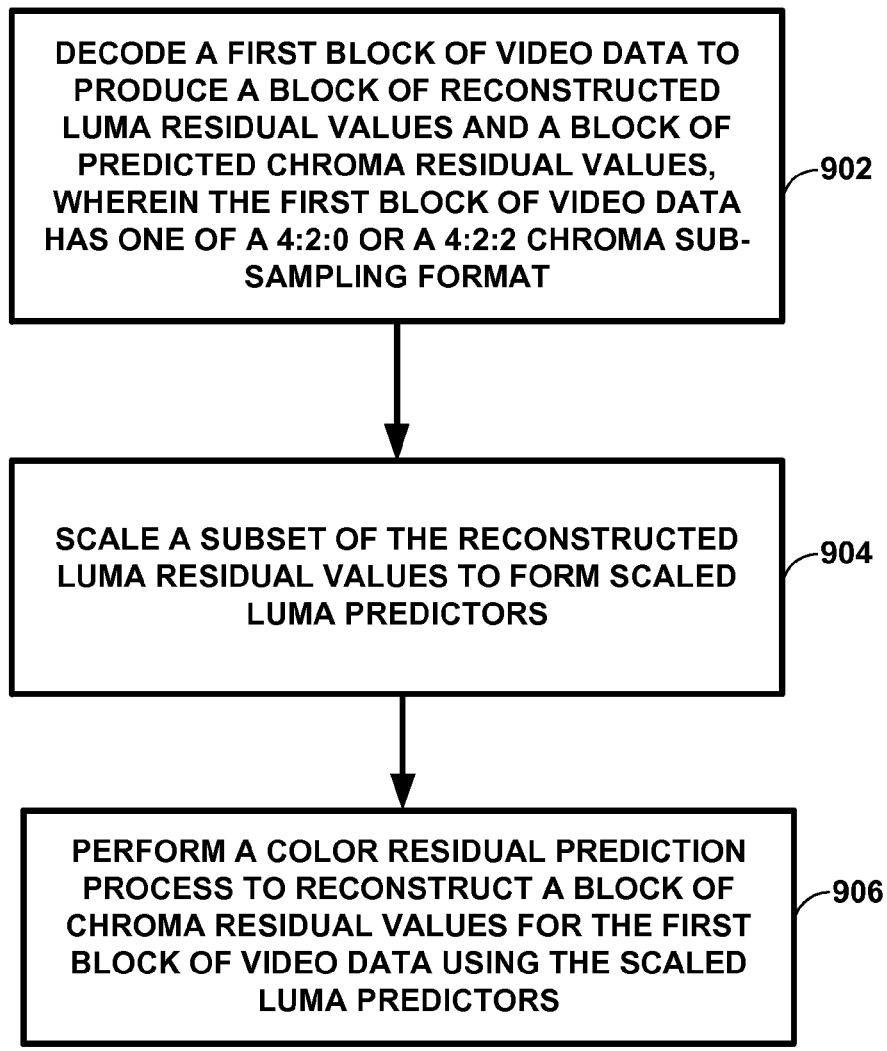
FIG. 9 is a flowchart illustrating an example decoding method of the disclosure.

FIG. 9 is a flowchart illustrating an example decoding method of the disclosure. The techniques of FIG. 9 may be implemented by video decoder 30, including color residual prediction processing unit 73.

In one example of the disclosure, video decoder 30 may be configured to decode a first block of video data to produce a block of reconstructed luma residual values and a block of predicted chroma residual values (902). As discussed above, video decoder 30 may produce the luma residual values and predicted chroma residual values using inter-prediction or intra-prediction. In accordance with the techniques of this disclosure, the first block of video data has one of a 4:2:0 or a 4:2:2 chroma sub-sampling format.

Color residual prediction processing unit 73 may be configured to scale a subset of the reconstructed luma residual values to form scaled luma predictors (904). As discussed with reference to FIGS. 5A-C, FIGS. 6A-B, and FIGS. 7A-B, the subset of reconstructed luma residual values used may differ based on the particular chroma sub-sampling format at used. Color residual prediction processing unit 73 may be configured to use one of the subsets of reconstructed luma residual values discussed above. As discussed above, for some subsets, color residual prediction processing unit 73 may be further configured to average two or more scaled reconstructed luma residual samples to form averaged scaled luma predictors.

Color residual prediction processing unit 73 may be further configured to perform a color residual prediction process to reconstruct a block of chroma residual values for the first block of video data using the scaled luma predictors (906). For example, color residual prediction processing unit 73 may apply a scaling factor to values of the luma residual block to produce scaled luma residual samples. Color residual prediction processing unit 73 may add the scaled luma residual samples to a block of predicted chroma residual samples block to reconstruct a block of chroma residual values.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding encoded video data, the method comprising:
   based on each respective transform unit size of respective transform unit sizes of a first set of blocks of a picture of the encoded video data being greater than 4×4, decoding each respective block of the first set of blocks of the picture to produce a respective block of reconstructed luma residual values and a respective block of predicted chroma residual values, wherein each respective block of the first set of blocks of the picture has one of a 4:2:0 or a 4:2:2 chroma sub-sampling format;
   based on each of the respective transform unit sizes of the first set of blocks being greater than 4×4, performing a color residual prediction process to reconstruct a respective block of chroma residual values for each respective block of the first set of blocks of the picture using a subset of the reconstructed luma residual values for the respective block as luma predictors for the respective block of predicted chroma residual values;
   based on each respective transform unit size of respective transform unit sizes of a second set of blocks of the picture being less than or equal to 4×4, decoding each respective block of the second set of blocks of the picture without performing color residual prediction;
   decoding a luma coded block flag for a first block of the second set of blocks of the picture of the encoded video data, wherein the first block of the second set of blocks has one of a 4:2:0 or a 4:2:2 chroma sub-sampling format and
   decoding the first block of the second set of blocks of the picture without performing color residual prediction based on the luma coded block flag indicating that the first block of the picture has no non-zero luma transform coefficients.

2. The method of claim 1, wherein performing the color residual prediction process further comprises scaling the luma predictors to form scaled luma predictors, and reconstructing the chroma residual values based on the scaled luma predictors.

3. The method of claim 2, wherein performing the color residual prediction process further comprises adding the scaled luma predictors to the predicted chroma residual values.

4. The method of claim 2, wherein a first block of the first set of blocks of the picture has the 4:2:2 chroma sub-sampling format,
   wherein the scaled luma predictors corresponding to the first block comprise scaled reconstructed luma residual values having a same position as the predicted chroma residual values corresponding to the first block, and
   wherein performing the color residual prediction process with respect to the first block further comprises adding a corresponding scaled luma predictor to each corresponding predicted chroma residual value.

5. The method of claim 2, wherein a first block of the first set of blocks of the picture has the 4:2:2 chroma sub-sampling format,
   wherein the subset of the reconstructed luma residual values corresponding to the first block comprises reconstructed luma residual values having a same position as the predicted chroma residual values and at least one other reconstructed luma residual value having a position immediately adjacent the predicted chroma residual values, and
   wherein performing the color residual prediction process with respect to the first block further comprises:
   for each position of a respective predicted chroma residual value, averaging a scaled reconstructed luma value having the same position as a corresponding predicted chroma residual value and the at least one other scaled reconstructed luma residual value having the position immediately adjacent the predicted chroma residual value to form an averaged luma predictor; and
   adding a corresponding averaged luma predictor to each corresponding predicted chroma residual value.

6. The method of claim 5, wherein the averaging is a simple averaging.

7. The method of claim 5, wherein the average is a weighted averaging.

8. The method of claim 5, wherein a first block of the first set of blocks of the picture has the 4:2:2 chroma sub-sampling format, and
   wherein the at least one other scaled reconstructed luma residual value for the first block comprises scaled reconstructed luma residual values having a position immediately to the right of each of the predicted chroma residual values for the first block.

9. The method of claim 5, wherein a first block of the first set of blocks of the picture has the 4:2:2 chroma sub-sampling format, and
   wherein the at least one other scaled reconstructed luma residual value for the first block comprises eight scaled reconstructed luma residual values having positions immediately adjacent each of the predicted chroma residual values for the first block.

10. The method of claim 2, wherein a first block of the first set of blocks of the picture has the 4:2:0 chroma sub-sampling format,
wherein the scaled luma predictors for the first block comprise at least one scaled reconstructed luma residual value having a position adjacent each of the predicted chroma residual values, and
wherein performing the color residual prediction process with respect to the first block further comprises adding a corresponding scaled luma predictor to each corresponding predicted chroma residual value.

11. The method of claim 10, wherein the scaled luma predictors for each predicted chroma residual value comprise a single scaled reconstructed luma value adjacent each chroma residual value.

12. The method of claim 10, wherein the scaled luma predictors for each predicted chroma residual value comprise two or more scaled reconstructed luma value adjacent each chroma residual value, the method further comprising:
averaging the two or more scaled reconstructed luma values.

13. An apparatus configured to decode encoded video data, the apparatus comprising:
a video data memory configured to store encoded video data representative of a picture; and
a video decoder in communication with the video data memory, the video decoder being configured to:
based on each respective transform unit size of respective transform unit sizes of a first set of blocks of a picture of the encoded video data being greater than 4×4, decode each respective block of the first set of blocks of the picture to produce a respective block of reconstructed luma residual values and a respective block of predicted chroma residual values, wherein each respective block of the first set of blocks of the picture has one of a 4:2:0 or a 4:2:2 chroma sub-sampling format;
based on each of the respective transform unit sizes of the first set of blocks being greater than 4×4, perform a color residual prediction process to reconstruct a respective block of chroma residual values for each respective block of the first set of blocks of the picture using a subset of the reconstructed luma residual values for the respective block as luma predictors for the respective block of predicted chroma residual values;
based on each respective transform unit size of respective transform unit sizes of a second set of blocks of the picture being less than or equal to 4×4, decode each respective block of the second set of blocks of the picture without performing color residual prediction;
decode a luma coded block flag for a first block of the second set of blocks of the picture of the encoded video data, wherein the first block of the second set of blocks has one of a 4:2:0 or a 4:2:2 chroma sub-sampling format and
decode the first block of the second set of blocks of the picture without performing color residual prediction based on the luma coded block flag indicating that the first block of the picture has no non-zero luma transform coefficients.

14. The apparatus of claim 13, wherein the video decoder is further configured to perform the color residual prediction process by scaling the luma predictors to form scaled luma predictors, and reconstructing the chroma residual values based on the scaled luma predictors.

15. The apparatus of claim 14, wherein the video decoder is further configured to perform the color residual prediction process by adding the scaled luma predictors to the predicted chroma residual values.

16. The apparatus of claim 14, wherein a first block of the first set of blocks of the picture has the 4:2:2 chroma sub-sampling format,
wherein the scaled luma predictors corresponding to the first block comprise scaled reconstructed luma residual values having a same position as the predicted chroma residual values corresponding to the first block, and
wherein the video decoder is further configured to perform the color residual prediction process with respect to the first block by adding a corresponding scaled luma predictor to each corresponding predicted chroma residual value.

17. The apparatus of claim 14, wherein a first block of the first set of blocks of the picture has the 4:2:2 chroma sub-sampling format,
wherein the subset of the reconstructed luma residual values corresponding to the first block comprises reconstructed luma residual values having a same position as the predicted chroma residual values and at least one other reconstructed luma residual value having a position immediately adjacent the predicted chroma residual values, and
wherein to perform the color residual prediction process with respect to the first block the video decoder is further configured to:
for each position of a respective predicted chroma residual value, average a scaled reconstructed luma value having the same position as a corresponding predicted chroma residual value and the at least one other scaled reconstructed luma residual value having the position immediately adjacent the predicted chroma residual value to form an averaged luma predictor; and
add a corresponding averaged luma predictor to each corresponding predicted chroma residual value.

18. The apparatus of claim 17, wherein the video decoder is configured to perform a simple averaging.

19. The apparatus of claim 17, wherein the video decoder is configured to perform a weighted averaging.

20. The apparatus of claim 17, wherein a first block of the first set of blocks of the picture has the 4:2:2 chroma sub-sampling format, and
wherein the at least one other scaled reconstructed luma residual value for the first block comprise scaled reconstructed luma residual values having a position immediately to the right of each of the predicted chroma residual values for the first block.

21. The apparatus of claim 17, wherein a first block of the first set of blocks of the picture has the 4:2:2 chroma sub-sampling format, and
wherein the at least one other scaled reconstructed luma residual value for the first block comprise eight scaled reconstructed luma residual values having positions immediately adjacent each of the predicted chroma residual values for the first block.

22. The apparatus of claim 14, wherein a first block of the first set of blocks of the picture has the 4:2:0 chroma sub-sampling format,
wherein the scaled luma predictors for the first block comprise at least one scaled reconstructed luma residual value having a position adjacent each of the predicted chroma residual values, and wherein the video decoder is further configured to perform the color residual prediction process with respect to the first block by adding a corresponding scaled luma predictor to each corresponding predicted chroma residual value.

23. The apparatus of claim 22, wherein the scaled luma predictors for each predicted chroma residual value comprise a single scaled reconstructed luma value adjacent each chroma residual value.

24. The apparatus of claim 22, wherein the scaled luma predictors for each predicted chroma residual value comprise two or more scaled reconstructed luma value adjacent each chroma residual value, wherein the video decoder is further configured to perform the color prediction process by averaging the two or more scaled reconstructed luma values.

25. A method of encoding video data, the method comprising:
based on each respective transform unit size of respective transform unit sizes of a first set of blocks of a picture of the encoded video data being greater than 4×4, encoding each respective block of the first set of blocks of the picture to produce a respective block of reconstructed luma residual values and a respective block of chroma residual values, wherein each respective block of the first set of blocks of the picture has one of a 4:2:0 or a 4:2:2 chroma sub-sampling format;
based on each of the respective transform unit sizes of the first set of blocks being greater than 4×4, performing a color residual prediction process to form a respective block of predicted chroma residual values for each respective block of the first set of blocks of the picture using a subset of the reconstructed luma residual values for the respective block as luma predictors for the respective block of chroma residual values;
based on each respective transform unit size of respective transform unit sizes of a second set of blocks of the picture being less than or equal to 4×4, encoding each respective block of the second set of blocks of the picture without performing color residual prediction;
encoding a luma coded block flag for a first block of the second set of blocks of the picture of the encoded video data, the luma coded block flag indicating that the first block of the picture has no non-zero luma transform coefficients, wherein the first block of the second set of blocks has one of a 4:2:0 or a 4:2:2 chroma sub-sampling format and
encoding the first block of the second set of blocks of the picture without performing color residual prediction based on the first block of the picture having no non-zero luma transform coefficients.

26. A non-transitory computer-readable storage medium storing instructions that, when executed, cause one or more processors of a device configured to decode encoded video data to:
based on each respective transform unit size of respective transform unit sizes of a first set of blocks of a picture of the encoded video data being greater than 4×4, decode each respective block of the first set of blocks of the picture to produce a respective block of reconstructed luma residual values and a respective block of predicted chroma residual values, wherein each respective block of the first set of blocks of the picture has one of a 4:2:0 or a 4:2:2 chroma sub-sampling format;
based on each of the respective transform unit sizes of the first set of blocks being greater than 4×4, perform a color residual prediction process to reconstruct a respective block of chroma residual values for each respective block of the first set of blocks of the picture using a subset of the reconstructed luma residual values for the respective block as luma predictors for the respective block of predicted chroma residual values;
based on each respective transform unit size of respective transform unit sizes of a second set of blocks of the picture being less than or equal to 4×4, decode each respective block of the second set of blocks of the picture without performing color residual prediction;
encode a luma coded block flag for a first block of the second set of blocks of the picture of the encoded video data, the luma coded block flag indicating that the first block of the picture has no non-zero luma transform coefficients, wherein the first block of the second set of blocks has one of a 4:2:0 or a 4:2:2 chroma sub-sampling format and
encode the first block of the second set of blocks of the picture without performing color residual prediction based on the first block of the picture having no non-zero luma transform coefficients.

* * * * *